E. C. MORIARTY.
FLUID RECOIL BRAKE FOR GUNS.
APPLICATION FILED APR. 16, 1919.

1,309,989.

Patented July 15, 1919.
2 SHEETS—SHEET 1.

Inventor
Ernest C. Moriarty

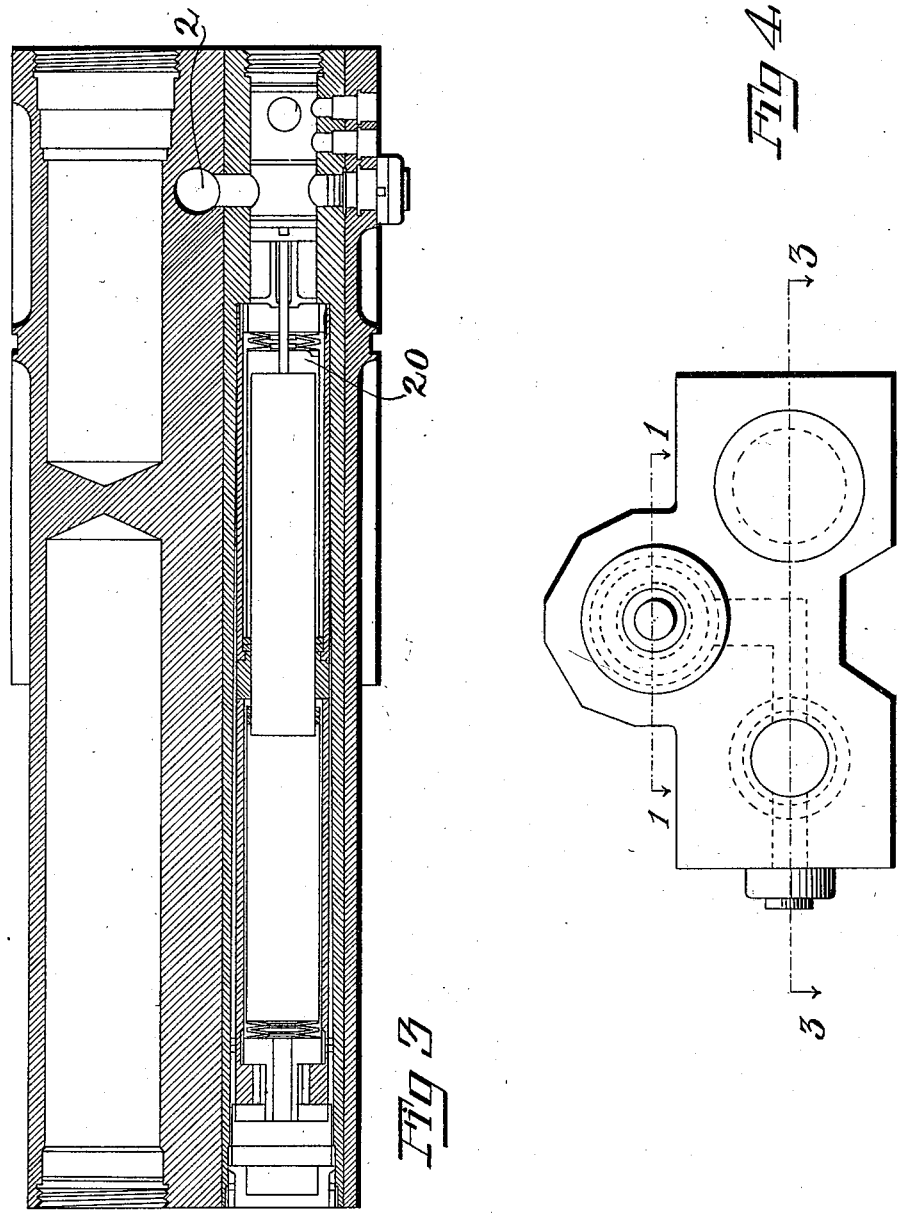

UNITED STATES PATENT OFFICE.

ERNEST C. MORIARTY, OF THE UNITED STATES ARMY.

FLUID RECOIL-BRAKE FOR GUNS.

1,309,989.      Specification of Letters Patent.      Patented July 15, 1919.

Application filed April 16, 1919. Serial No. 290,597.

(FILED UNDER THE ACT OF MARCH 3, 1883, 22 STAT. L., 625.)

*To all whom it may concern:*

Be it known that I, ERNEST C. MORIARTY, Lt., Ordnance Department, U. S. A., a citizen of the United States, stationed at Washington, D. C., have invented an Improvement in Fluid Recoil-Brakes for Guns, of which the following is a specification.

The invention described herein may be used by the Government, or any of its officers or employees in prosecution of work for the Government, or by any other person in the United States, without payment of any royalty thereon.

In my co-pending application, Serial Number 290,596, filed of even date herewith, I have disclosed a form of fluid recoil brake mechanism for heavy ordnance guns in which the brake piston is elongated and projects a substantial distance beyond one end of the brake cylinder. With some type of guns, it is disadvantageous to have the piston project beyond the end of the brake cylinder, and it is, therefore, the object of this invention to provide a fluid recoil brake in which, while preserving the objections and advantages aimed at in the invention of said co-pending application, it will be possible to eliminate the projecting portion of said piston, or materially reduce the length thereof, so that the actual length of projection will be unobjectionable.

To this end, the invention comprehends, *inter alia*, a fluid-containing brake-cylinder, in which moves a brake piston communicating as usual with the displacer-cylinder in which moves a floating or free piston, said brake-piston being encircled by an independently longitudinally - movable sleeve provided with a longitudinal concentric chamber, the inner wall of said chamber, at one end thereof, being provided with throttling ports and the outer wall, at the other end of said chamber, being transversely slotted whereby said chamber is open at this end so as to communicate with the space between said sleeve and the wall of the brake cylinder.

The accompanying drawing discloses an exemplary embodiment of the underlying principles of my invention. Like reference characters denote corresponding parts in the several views. In the drawing:

Fig. 3 is a section on the line 3—3, Fig. 4;

Fig. 4 is a view in front elevation of the brake.

Figure 1:
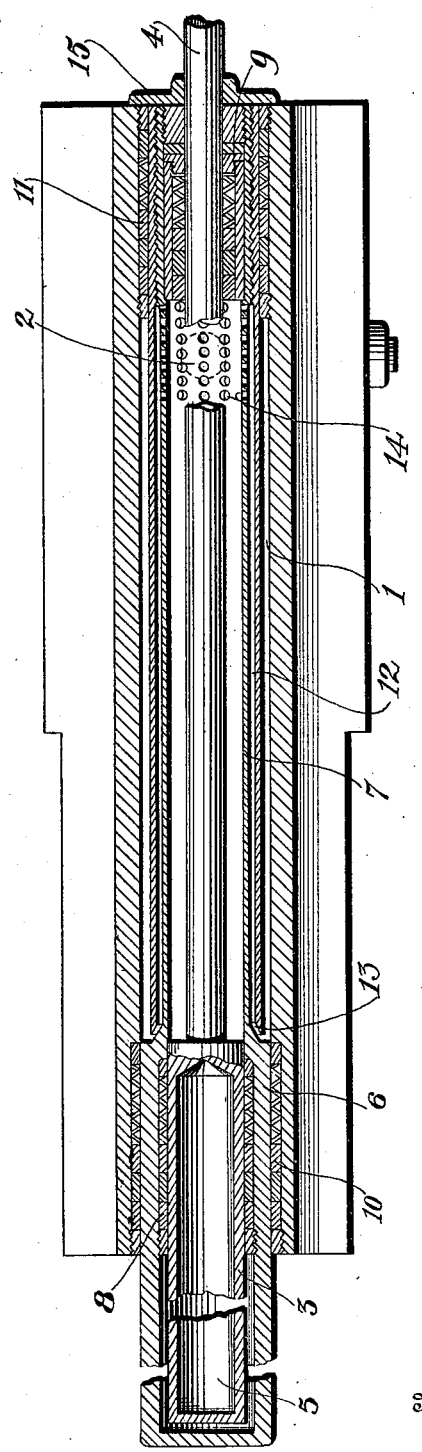
Figure 1 is a section on the line 1—1, Fig. 4 of my fluid recoil brake, showing the "in-battery" position of the parts.
Figure 2:
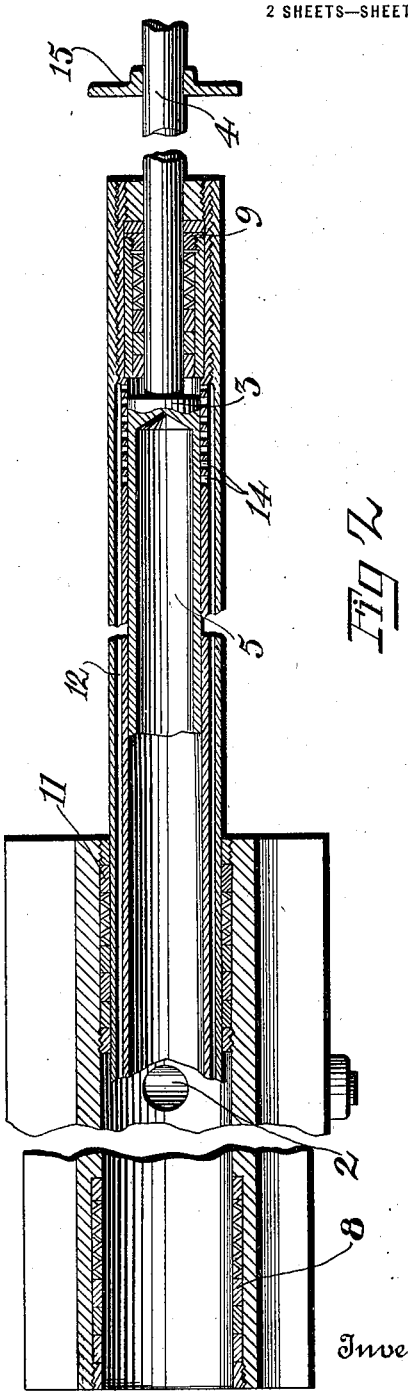
Fig. 2 is a similar view, showing the position of the parts upon recoil.

Referring now in detail to the drawing:

1 designates the fluid containing brake-cylinder of a fluid recoil brake for guns. The cylinder communicates by a port 2, as usual, with the customary displacer cylinder 20.

Reciprocating in said brake cylinder is the brake piston 3 provided with the piston rod 4, which is connected in the customary manner with the gun, so as to move therewith upon recoil and return. For the sake of lightness, said piston may be hollow, as shown at 5.

Encircling said piston is a tubular sleeve comprising, preferably, a head 6 and an elongated concentric neck 7 of lesser diameter. The head carries internally thereof a packing 8 encircling the piston 3. The neck 7 internally carries, at the end thereof remote from the head 6, a packing 9 encircling the piston rod 4.

The head 6 is encircled by and works through a packing 10 carried by the brake cylinder, at one end thereof.

A similar packing 11 is carried by the other end of the cylinder 1 and encircles the neck 7 of the sleeve.

It will thus be noted that, whereas the packings 8 and 9 move with the head 6 and its neck 7, the packings 10 and 11 are fixed or stationary relative thereto.

The neck 7 of the sleeve is provided with a concentric longitudinal chamber 12 extending, preferably, from the end of the sleeve adjacent the head 6 to a point short of the other end of the sleeve. At one end of said chamber adjacent the head 6, it communicates, as shown at 13, with the space between the outer surface of said sleeve and the wall of the brake cylinder 1. Adjacent the closed end of the chamber 12, the inner wall thereof is provided with throttling ports 14.

The brake cylinder 1 contains, as usual, a suitable brake fluid, such as glycerin or oil, the fluid normally filling the same.

If desired, a disk 15 may concentrically encircle the piston rod 4, and may be secured in a suitable manner so as to move therewith.

In operation, upon recoil of the gun, the piston 3 and sleeve 7 will travel to the right in Fig. 1, but at differential speeds, the piston traveling more rapidly than the sleeve. The oil or glycerin thus displaced by the movement of the piston escapes through the ports 14, the travel of the fluid thereupon being through the chamber 12 and out of the same at the open end 13 thereof and thence through the port 2 into the displacer chamber, for a purpose well known. As the piston travels to the right in Fig. 1, it successively closes passage through the throttling ports 14, and thus the trapped fluid brakes the piston.

In compliance with the revised statutes of the United States relating to patents, I have described, with great particularity, a concrete or physical embodiment of my invention, it being understood that the disclosure is merely illustrative and that the invention is susceptible of many changes.

Having thus fully described my invention, what I claim as new and desire to secure by Letters Patent of the United States is:

1. In a fluid brake for guns, a brake cylinder, a piston moving therein, an independently longitudinally movable sleeve encircling said piston and having a longitudinally extending chamber communicating at one end thereof with the space interior of said sleeve and at the other end thereof with the space outside of said sleeve.

2. In a fluid brake for guns, a brake cylinder, a piston moving therein, and an independently longitudinally movable sleeve encircling said piston and having a longitudinally extending concentric chamber communicating at one end thereof with the space interior of said sleeve and at the other end thereof with the space outside of said sleeve.

3. In a fluid brake for guns, a brake cylinder, a piston moving therein, and an independently longitudinally movable sleeve encircling said piston and having a longitudinally extending chamber communicating at one end thereof with the space interior of said sleeve and at the other end thereof with the space outside of said sleeve, said piston and sleeve traveling at differential speeds.

4. In a fluid brake for guns, a brake cylinder, a piston moving therein, and an independently longitudinally movable sleeve encircling said piston and having a longitudinally extending chamber communicating at one end thereof with the space interior of said sleeve and at the other end thereof with the space outside of said sleeve, said sleeve having a slower rate of movement relative to said piston.

5. In a fluid brake for guns, a brake cylinder, a piston moving therein and an independently longitudinally movable sleeve encircling said piston and having a longitudinally extending chamber communicating at one end thereof with the space interior of said sleeve and at the other end thereof with the space outside of said sleeve, said sleeve comprising a head and an elongated neck.

6. In a fluid brake for guns, a brake cylinder, a piston moving therein, and an independently longitudinally movable sleeve encircling said piston and having a longitudinally extending chamber communicating at one end thereof with the space interior of said sleeve and at the other end thereof with the space outside of said sleeve, and stationary packings carried by said brake cylinder and encircling said sleeve.

7. In a fluid brake for guns, a brake cylinder, a piston moving therein, an independently longitudinally movable sleeve encircling said piston and having a longitudinally extending chamber communicating at one end thereof, with the space interior of said sleeve and at the other end thereof with the space outside of said sleeve, and packings interiorly carried by said sleeve and encircling said piston.

8. In a fluid brake for guns a brake cylinder, a piston moving therein, an independently longitudinally movable sleeve encircling said piston and having a longitudinally extending chamber communicating at one end thereof with the space interior of said sleeve and at the other end thereof with the space outside of said sleeve, stationary packings carried by the brake cylinder and encircling said sleeve, and packings interiorly carried by said sleeve and encircling said piston.

ERNEST C. MORIARTY.

Copies of this patent may be obtained for five cents each, by addressing the "Commissioner of Patents, Washington, D. C."